(12) United States Patent
Kunihiro et al.

(10) Patent No.: US 12,466,478 B2
(45) Date of Patent: Nov. 11, 2025

(54) AUTONOMOUS DRIVING CONTROL DEVICE

(71) Applicant: TOYOTA JIDOSHA KABUSHIKI KAISHA, Toyota (JP)

(72) Inventors: Yoji Kunihiro, Susono (JP); Takahiro Kojo, Gotemba (JP); Yutaka Aoki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/603,859

(22) Filed: Mar. 13, 2024

(65) Prior Publication Data

US 2024/0343302 A1    Oct. 17, 2024

(30) Foreign Application Priority Data

Apr. 17, 2023    (JP) ................ 2023-067386

(51) Int. Cl.
*B62D 6/00*    (2006.01)
*B62D 1/28*    (2006.01)

(52) U.S. Cl.
CPC ............. *B62D 6/008* (2013.01); *B62D 1/286* (2013.01)

(58) Field of Classification Search
CPC ........ B62D 6/008; B62D 6/002; B62D 6/007; B62D 6/00; B62D 1/286; B62D 5/046; B60W 60/005; B60W 2510/202; B60W 2510/207; B60W 2710/202
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 11,904,961 B2 * | 2/2024 | Ojima ................. | B60W 60/005 |
| 2001/0054519 A1 | 12/2001 | Nishiwaki et al. | |
| 2019/0286127 A1 * | 9/2019 | Watanabe ............ | G05D 1/0061 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |

(Continued)

FOREIGN PATENT DOCUMENTS

JP    2002-002519 A    1/2002

*Primary Examiner* — Lori Wu
(74) *Attorney, Agent, or Firm* — Sughrue Mion, PLLC

(57) ABSTRACT

An autonomous driving control device includes a steering determination unit that determines whether a driver has operated a steering unit while driving with an actuator controlled in a first control mode, an operation speed calculation unit that calculates at least one of a deviation speed, which is the change rate of deviation between a target steering angle during autonomous driving and an actual steering angle, and a steering speed, which is the change rate of the actual steering angle, and a control mode switching unit that, when it is determined that the driver has operated the steering unit, changes an instruction value to be output to the actuator from a first target control amount in the first control mode to a second target control amount in the second control mode at a change rate corresponding to at least one of the deviation speed and the steering speed described above.

5 Claims, 7 Drawing Sheets

(56) References Cited

U.S. PATENT DOCUMENTS

| | | | |
|---|---|---|---|
| 2021/0146956 A1 | 5/2021 | Fujita et al. | |
| 2021/0146958 A1 | 5/2021 | Tanaka et al. | |
| 2022/0227416 A1* | 7/2022 | Suzuki | B62D 15/025 |
| 2024/0067228 A1* | 2/2024 | Kim | B60W 60/0059 |
| 2024/0158005 A1* | 5/2024 | Okada | B62D 1/283 |

* cited by examiner

AUTONOMOUS DRIVING CONTROL DEVICE

CROSS-REFERENCE TO RELATED APPLICATION

This application claims priority to Japanese Patent Application No. 2023-067386 filed on Apr. 17, 2023, incorporated herein by reference in its entirety.

BACKGROUND

1. Technical Field

The present disclosure relates to an autonomous driving control device that controls the steering angle for traveling without the need for a driver to perform the steering operation.

2. Description of Related Art

Japanese Unexamined Patent Application Publication No. 2002-002519 (JP 2002-002519 A) describes a steering control device that reduces a deterioration in the operation feeling of the steering wheel when, while traveling by controlling the steering angle without the need for the driver to perform the steering operation, the driver operates the steering wheel to avoid an obstacle. The steering control device described in JP 2002-002519 A calculates the target steering angle from the positions of the vehicle and the lane and, based on the manual steering torque that is the driver's steering torque on the steering wheel, corrects the target steering angle. After that, the steering control device calculates the target steering torque for matching the corrected target steering angle and the actual steering angle that is the steering angle of the steering wheel, based on the deviation between the corrected target steering angle and the actual steering angle. When the manual steering torque is equal to or larger than a predetermined torque, the steering control device is configured, under a determination that the operation is performed to avoid an emergency, to maintain, or gradually reduce over time, the target steering torque at the time of the determination and to output the torque to the power steering motor by superimposing the manual steering torque to the target steering torque. The steering control device is also configured to set the gain, used to correct the target steering angle, to a smaller value as the vehicle speed is higher.

SUMMARY

The steering control device described in JP 2002-002519 A is configured to gradually reduce the target steering torque when it is determined, based on the manual steering torque, that the operation is an emergency avoidance operation. However, J P 2002-002519 A does not describe anything about a change rate for reducing the target steering torque. Therefore, if the target steering torque is reduced at a uniformly determined change rate, the reduction rate of the target steering torque when the steering wheel is turned at a relatively low speed is the same and as that when the steering wheel is turned at a relatively high speed. In such a case, the steering torque required for the driver to turn the steering wheel is too small than normal when the steering wheel is turned at low speed and, conversely, the steering torque required for the driver to turn the steering wheel is too large than normal when the steering wheel is turned at high speed. This means that, since the steering torque to turn the steering wheel is different depending on the way the steering wheel is turned, the driver may feel uncomfortable.

In view of the technical problem described above, it is an object of the present disclosure to provide an autonomous driving control device that can switch the control mode at an appropriate timing according to the way the steering operation is performed by the driver.

To achieve the above object, the present disclosure relates to an autonomous driving control device including a steering unit, steered wheels, an actuator, and a detection unit. The steering unit is configured to be operated by a driver. The steered wheels are configured to be steered in response to the operation of the steering unit. The actuator is configured to generate a steering force to steer the steered wheels. The detection unit is configured to detect the operation amount of the steering unit. The autonomous driving control device is configured to be able to switch between a first control mode and a second control mode. The first control mode is a mode in which the actuator is controlled for driving without the need for the driver to operate the steering unit. The second control mode is a mode in which the actuator is controlled for driving in such a way that the steering force required to operate the steering unit is smaller than in the first control mode. The autonomous driving control device includes a controller that controls the actuator. The controller includes a steering determination unit, an operation speed calculation unit, and a control mode switching unit. The steering determination unit is configured to determine that the driver has operated the steering unit while driving with the actuator controlled in the first control mode. The operation speed calculation unit is configured to calculate a speed that is at least one of a deviation speed and a steering speed. The deviation speed is the change rate of deviation between the target steering angle during autonomous driving and the actual steering angle that is based on an operation amount detected by the detection unit. The steering speed is the change rate of the actual steering angle. The control mode switching unit is configured to change, when the steering determination unit determines that the driver has operated the steering unit, an instruction value to be output to the actuator from the instruction value corresponding to the first target control amount of the actuator determined according to the first control mode to an instruction value corresponding to the second target control amount of the actuator determined according to the second control mode at a change rate corresponding to a speed that is at least one of the deviation speed and the steering speed calculated by the operation speed calculation unit.

In the present disclosure, the actuator may be configured to generate a reaction force in opposition to the steering force of the steering unit applied by the driver, and the first control mode may have the reaction force that is higher than the second control mode.

In the present disclosure, the actuator may be configured to generate the steering force to steer the steered wheels, and the first control mode may have the steering force that is higher than the second control mode.

In the present disclosure, the first control mode may be configured to determine the first target control amount by multiplying a deviation between the target steering angle and the actual steering angle by a first gain, the second control mode may be configured to determine the second target control amount by multiplying a deviation between the target steering angle and the actual steering angle by a second gain smaller than the first gain, and the control mode switching unit may be configured to change a gain from the first gain to the second gain at a change rate corresponding to a speed that is at least one of the deviation speed and the steering speed.

In the present disclosure, the control mode switching unit may be configured, based on the correlation obtained in advance between the deviation speed or the steering speed and the operation amount of the steering unit when the driver operates the steering unit, to determine the change rate of the instruction value so that, when the steering unit is operated at the deviation speed or the steering speed, the second target control amount is achieved at a point when the operation amount is reached.

In the present disclosure, when it is determined that the driver has operated the steering unit during driving in the first control mode in which driving is controlled by the actuator without the need for the driver to operate the steering unit, the instruction value to be sent to the actuator is changed from the first target control amount in the first control mode to the second target control amount in the second control mode at a change rate corresponding to a speed that is at least one of the deviation speed, which is the change rate of deviation between the target steering angle during autonomous driving and the steering angle during actual driving (actual steering angle), and the steering speed that is the change rate of the actual steering angle. Therefore, the instruction value can be switched from the first target control amount to the second target control amount at the time when the driver increases the operation amount of the steering unit to a predetermined amount. Switching the instruction value in this way makes it possible to reduce the difference between the time when the operation amount of the steering unit is changed to the predetermined amount and the time when the first target control amount is switched to the second target control amount. As a result, it is possible to reduce a sudden change in the operation feeling of the steering unit and to reduce deterioration in operability.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to the drawings. Note that the embodiment described below is only an example of implementing the present disclosure and that the embodiment does not limit the present disclosure.

Figure 1:
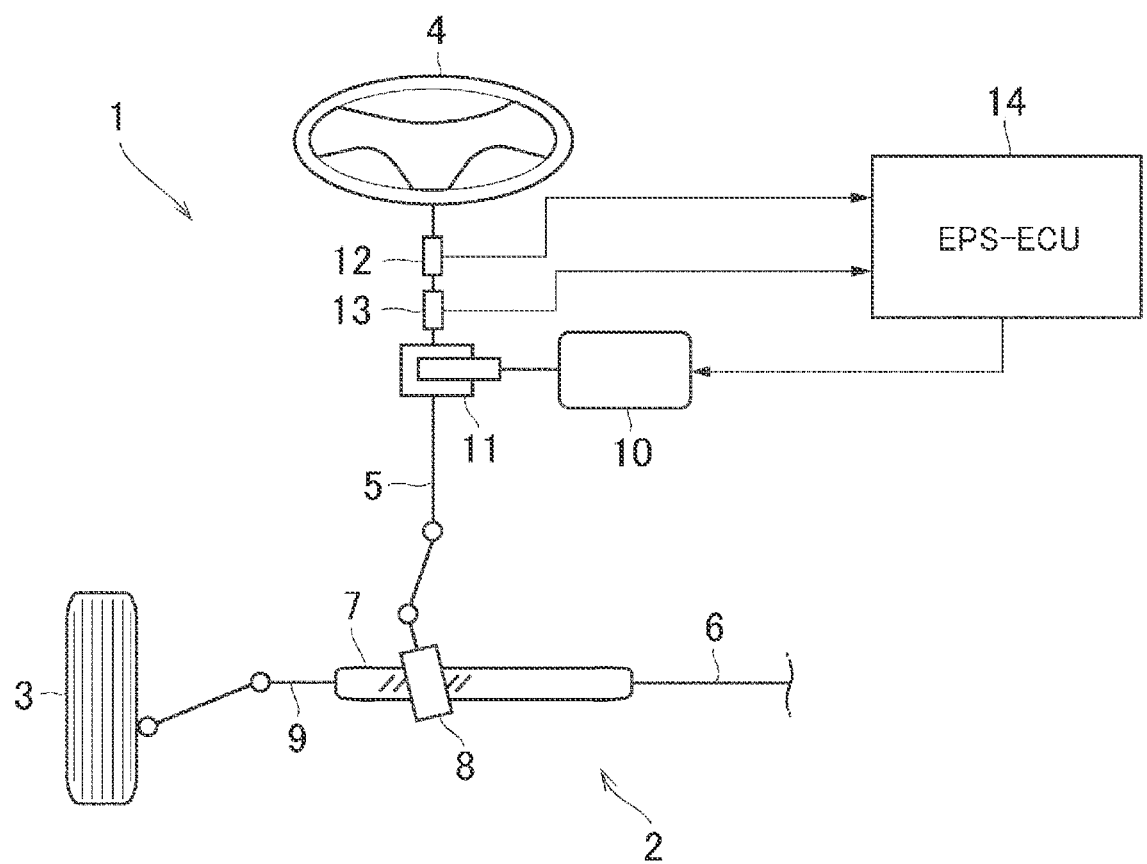
FIG. 1 is a schematic diagram showing an example of an electric power steering device to which the present disclosure can be applied.

An autonomous driving control device in the embodiment of the present disclosure is configured to allow a vehicle to travel in the autonomous driving mode in which the steering angle is automatically controlled without the need for the driver to perform the steering operation and, in addition, when the driver operates a steering unit such as the steering wheel, is configured to switch the steering angle control during autonomous driving to the control that depends on the amount of steering unit operation by the driver to allow the vehicle to travel. FIG. 1 shows an example of a steering device that can automatically and manually change the steering angle in this way. The steering device shown in FIG. 1 is an electric power steering system (EPS) 1 configured to be able to electrically control the torque for changing the steering angle (referred to as the steering torque in the description below) and, in addition, to be able to control an assist torque for adjusting the steering torque of the driver. Its basic configuration is schematically shown.

The EPS 1, mounted on a vehicle 2, is configured to steer steered wheels 3, such as front wheels, that change the direction of the vehicle 2 (turn the direction). A steering wheel 4 is provided as a steering unit that performs this operation. The steering wheel 4, connected to a steering linkage 6 via a steering shaft 5, is configured to steer the steered wheels 3 according to the turning angle of the steering wheel 4. The steering linkage 6 has, for example, a rack 7 that moves back and forth in the width direction of the vehicle 2, a pinion 8 that meshes with the rack 7, and a tie rod 9 that connects the rack 7 and the steering wheel 3. To the pinion 8, the steering shaft 5 described above is connected. Therefore, when the steering wheel 4 is turned to the right or left, the pinion 8 rotates to cause the rack 7 to move to the right or left and, accordingly, the steered wheels 3 are steered. That is, the steered wheels 3 are steered in conjunction with the operation of the steering wheel 4.

In the embodiment described below, it is assumed that the operation amount of the steering wheel 4 that moves the vehicle 2 straight ahead corresponds to a steering angle of "zero degrees" and that, from this position, the steering amount measured to the left is a "positive" steering angle, and the steering amount measured to the right is a "negative" steering amount. Therefore, operating the steering wheel 4 to turn the vehicle 2 to the left increases the steering angle, while operating the steering wheel 4 to turn the vehicle 2 to the right decreases the steering angle.

A motor 10 is provided to generate steering torque or to assist the steering torque applied by the driver. The motor 10 is configured to add or subtract torque to or from the steering wheel 4 or the steering shaft 5, or to add or subtract front-rear power to or from the rack 7, that is, to generate steering force to steer the steered wheels 3. In the example shown in FIG. 1, the motor 10 is connected to the steering shaft 5 via a decelerator 11. This motor 10 corresponds to the "actuator" in the embodiment of the present disclosure.

In addition, a torque sensor 12 that detects torque acting on the steering shaft 5 and a steering angle sensor 13 that detects a steering angle (operation amount), which is the rotation angle of the steering shaft 5, are provided. These sensors 12 and 13 send detection signals to an electronic control unit (EPS-ECU) 14 for the electric power steering system (EPS). The steering angle sensor 13 corresponds to the "detection unit" in the embodiment of the present disclosure, and the EPS-ECU 14 corresponds to the "controller" in the embodiment of the present disclosure.

Figure 2:
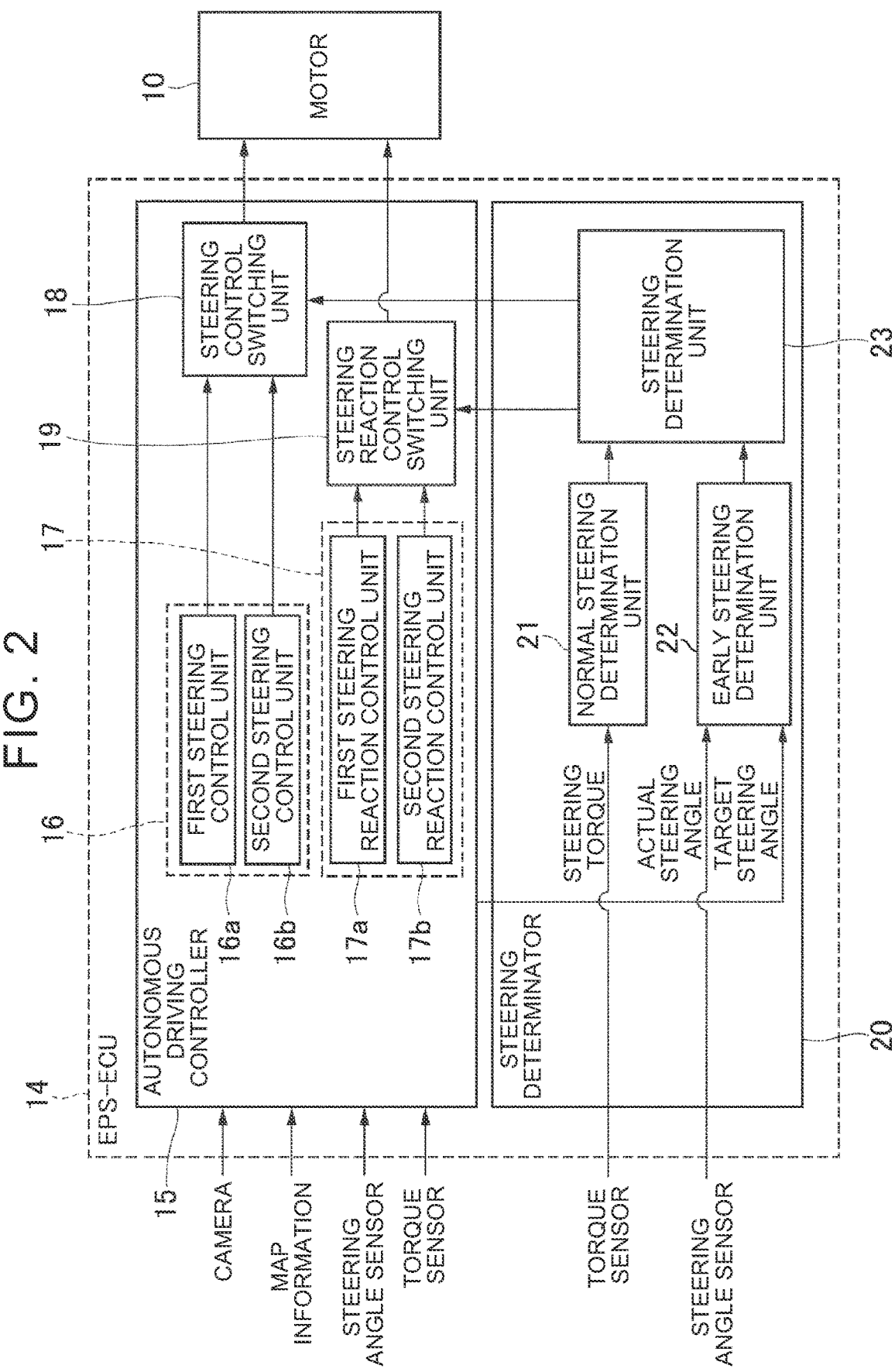
FIG. 2 is a block diagram showing a configuration of an EPS-ECU.

FIG. 2 is a block diagram showing a configuration of the EPS-ECU 14. The EPS-ECU 14 shown in FIG. 2, mainly composed of a microcomputer, is configured to determine command signals to be output to the motor 10, based on the received signals and pre-stored calculation formulas, maps, etc.

The EPS-ECU 14 is configured to enable autonomous driving, in which the motor 10 is controlled to allow the vehicle 2 to follow a predetermined traveling route (including the position within the driving lane) without the need for the driver to operate the steering wheel 4. In addition to the autonomous driving mode in which the driver does not operate the steering wheel 4 as described above (hereinafter referred to as the first mode), the EPS-ECU 14 is configured to be able to set a mode in which the driver can operate the steering wheel 4 as necessary during autonomous driving (hereinafter referred to as the second mode). That is, the second mode is configured in such a way that the steering angle is controlled with priority given to the driver's intention when the driver operates the steering wheel 4 during autonomous driving and that the steering angle is automatically controlled to follow the traveling route when the driver does not operate the steering wheel 4. In other words, the second mode controls the motor 10 so that the steering torque required to operate the steering wheel 4 is smaller than in the first mode. The first mode and the second mode are configured to allow the driver to select the mode as necessary, for example, by operating an operation unit, such as a switch not shown, provided on the vehicle 2. The first mode corresponds to the "first control mode" in the embodiment of the present disclosure, and the second mode corresponds to the "second control mode" in the embodiment of the present disclosure.

In the example shown in FIG. 2, the EPS-ECU 14 includes an autonomous driving controller 15 that controls the output torque of the motor 10 for performing autonomous driving as described above. The autonomous driving controller 15 includes a steering control unit 16 that calculates the torque required for controlling the steering angle of the vehicle 2 without the need for the driver to operate the steering wheel 4. This steering control unit 16 is configured to sequentially calculate the target steering torque required, for example, for driving the vehicle 2 along a traveling route. Therefore, the autonomous driving controller 15, shown in FIG. 2, receives the surrounding information, such as the camera-captured information and the map information, and the signals from the sensors that identify the current position information. Upon receiving the surrounding information and the signals, the steering control unit 16 is configured to calculate the amount of difference between the current position of the vehicle 2, identified based on the camera-captured information, map information, etc., and the traveling route formed in advance for autonomous driving, to calculate the target steering angle θt for correcting the amount of difference, and to calculate the target steering torque from the deviation Δθ between the target steering angle θt and the actual steering angle θr detected by the steering angle sensor 13.

The above-described difference between the traveling route and the current position of the vehicle 2 is generated by external factors of the vehicle 2, such as wind force that the vehicle 2 receives and the road surface conditions, and by internal factors caused by turning the steering wheel 4.

The steering control unit 16 includes a first steering control unit 16a that calculates the target steering torque when the first mode is selected (hereinafter referred to as the first target steering torque) and a second steering control unit 16b that calculates the target steering torque when the second mode is selected (hereinafter referred to as the second target steering torque). The first steering control unit 16a and the second steering control unit 16b are each configured to calculate the target steering torque by multiplying the deviation Δθ between the target steering angle θt and the steering angle during actual driving (hereinafter referred to as the actual steering angle) θr by a predetermined gain, with the gain for the first steering control unit 16a larger than that for the second steering control unit 16b. That is, the first target steering torque is larger than the second target steering torque, meaning that the vehicle 2 can be returned to the traveling route more quickly when the first mode is selected than when the second mode is selected. The gain for the first steering control unit 16a corresponds to the "first gain" in the embodiment of the present disclosure, and the gain for the second steering control unit 16b corresponds to the "second gain" in the embodiment of the present disclosure.

The autonomous driving controller 15 further includes a steering reaction control unit 17 that calculates a target reaction torque in opposition to the steering torque when the steering wheel 4 is operated. The steering reaction control unit 17 is configured to calculate the target reaction torque by multiplying the deviation between the target steering angle θt and the actual steering angle θr by a predetermined gain.

The steering reaction control unit 17 includes a first steering reaction control unit 17a that calculates the target reaction torque when the first mode is selected (hereinafter referred to as the first target reaction torque) and a second steering reaction control unit 17b that calculates the target reaction torque when the second mode is selected (hereinafter referred to as the second target reaction torque). The gain of the first steering reaction control unit 17a, which is to be multiplied by the deviation between the target steering angle θt and the actual steering angle θr, is set larger than that of the second steering reaction control unit 17b. In other words, the gain is determined in such a way that the assist torque of the first steering reaction control unit 17a is smaller than that of the second steering reaction control unit 17b. Therefore, the first target reaction torque is larger than the second target reaction torque, meaning that the torque required to turn the steering wheel 4 is larger when the first mode is selected than when the second mode is selected. The gain of the first steering reaction control unit 17a corresponds to the "first gain" in the embodiment of the present disclosure, and the gain of the second steering reaction control unit 17b corresponds to the "second gain" in the embodiment of the present disclosure.

The autonomous driving controller 15, shown in FIG. 2, is configured to select one of the control units 16a and 16b for determining the target steering torque according to the set control mode that is one of the first mode and the second mode. Similarly, the autonomous driving controller 15 is configured to select one of the control units 17a and 17b for determining the target reaction torque according to the set control mode. In addition, when the signal indicating that the steering wheel 4 has been operated is received by a steering determination unit 23, which will be described later, while the first mode is selected, the autonomous driving controller 15 is configured to switch the instruction steering torque for the motor 10 from the first target steering torque to the second target steering torque and to switch the instruction reaction torque for the motor 10 from the first target reaction torque to the second target reaction torque. To do so, the autonomous driving controller 15 includes a steering control switching unit 18 that switches the instruction steering torque for the motor 10, and a steering reaction control switching unit 19 that switches the instruction reaction torque for the motor 10. The first target steering torque and the first target reaction torque correspond to the "first target control amount" in the embodiment of the present disclosure, the second target steering torque and the second target reaction torque correspond to the "second target control amount" in the embodiment of the present disclosure, and the steering control switching unit 18 and the steering reaction control switching unit 19 correspond to the "control mode switching unit" in the embodiment of the present disclosure.

In addition, the autonomous driving controller 15 is configured to add the instruction steering torque, which is output from the steering control switching unit 18, and the instruction reaction torque, which is output from the steering reaction control switching unit 19, and to output the electrical signal that generates the torque, determined by adding the torques as described above, to the motor 10.

The EPS-ECU 14 also includes a steering determinator 20 for determining that the driver has operated the steering wheel 4 during autonomous driving. This steering determinator 20 includes a normal steering determination unit 21 that determines an intervention operation when the steering wheel 4 is operated at a relatively low speed and a early steering determination unit 22 that determines an intervention operation when the steering wheel 4 is operated at a relatively high speed.

The normal steering determination unit 21 is configured to determine, based on the steering torque detected by the torque sensor 12, whether the steering operation has been performed. More specifically, the normal steering determination unit 21 is configured to calculate the deviation between the minimum value and the maximum value of the steering torque within a predetermined time detected by the torque sensor 12 and, when the deviation becomes equal to or larger than a predetermined threshold torque, to determine that the steering operation has been performed. This is because, when the driver operates the steering wheel 4 during traveling while the motor torque, calculated by the autonomous driving controller 15 described above, is being output, a torque in the direction opposite to the motor torque or a torque equal to or larger than the motor torque acts on the steering wheel 4, which becomes a reaction torque and is detected by the torque sensor 12.

The normal steering determination unit 21 described above determines a driver's steering operation from the detection value of the torque sensor 12 within a predetermined time. Therefore, the normal steering determination unit 21 is suitable for determining an intervention operation when the driver slightly operates the steering wheel 4 and the vehicle 2 gradually departs from the traveling route. On the other hand, since the torque sensor 12 detects torque, for example, based on the torsion angle of the steering shaft 5, a torque is detected when the direction of the motor torque for returning the vehicle 2 to the traveling route through autonomous driving control is opposite to the direction of the operation of the steering wheel 4 by the driver. Therefore, the determination of an intervention operation by the normal steering determination unit 21 inevitably involves a delay until the determination is established. To address this problem, the steering determinator 20, shown in FIG. 2, includes an early steering determination unit 22 that, when the steering wheel 4 is operated at a high speed, determines the intervention operation at an early stage.

The early steering determination unit 22 is configured to receive the signals of the actual steering angle θr, which is the detection value of the steering angle sensor 13, and the target steering angle θt, which is calculated by the autonomous driving controller 15, and, based on the actual steering angle θr and the target steering angle θt, to determine whether the driver has performed a steering operation. More specifically, when the absolute value of the change rate (deviation speed) of deviation Δθ, obtained by subtracting the target steering angle θt from the actual steering angle θr, is equal to or larger than a predetermined speed, the early steering determination unit 22 is configured to determine that the driver has performed a steering operation.

Then, the signals determined by the normal steering determination unit 21 and the early steering determination unit 22 are input to the steering determination unit 23. The steering determination unit 23 outputs the signal indicating, by at least one of the determination units 21 and 22, whether or not it is determined that the driver has performed a steering operation to the steering control switching unit 18 and the steering reaction control switching unit 19. Therefore, based on the signal received from the steering determination unit 23, the steering control switching unit 18 and the steering reaction control switching unit 19 determine the motor torque.

Figure 3:
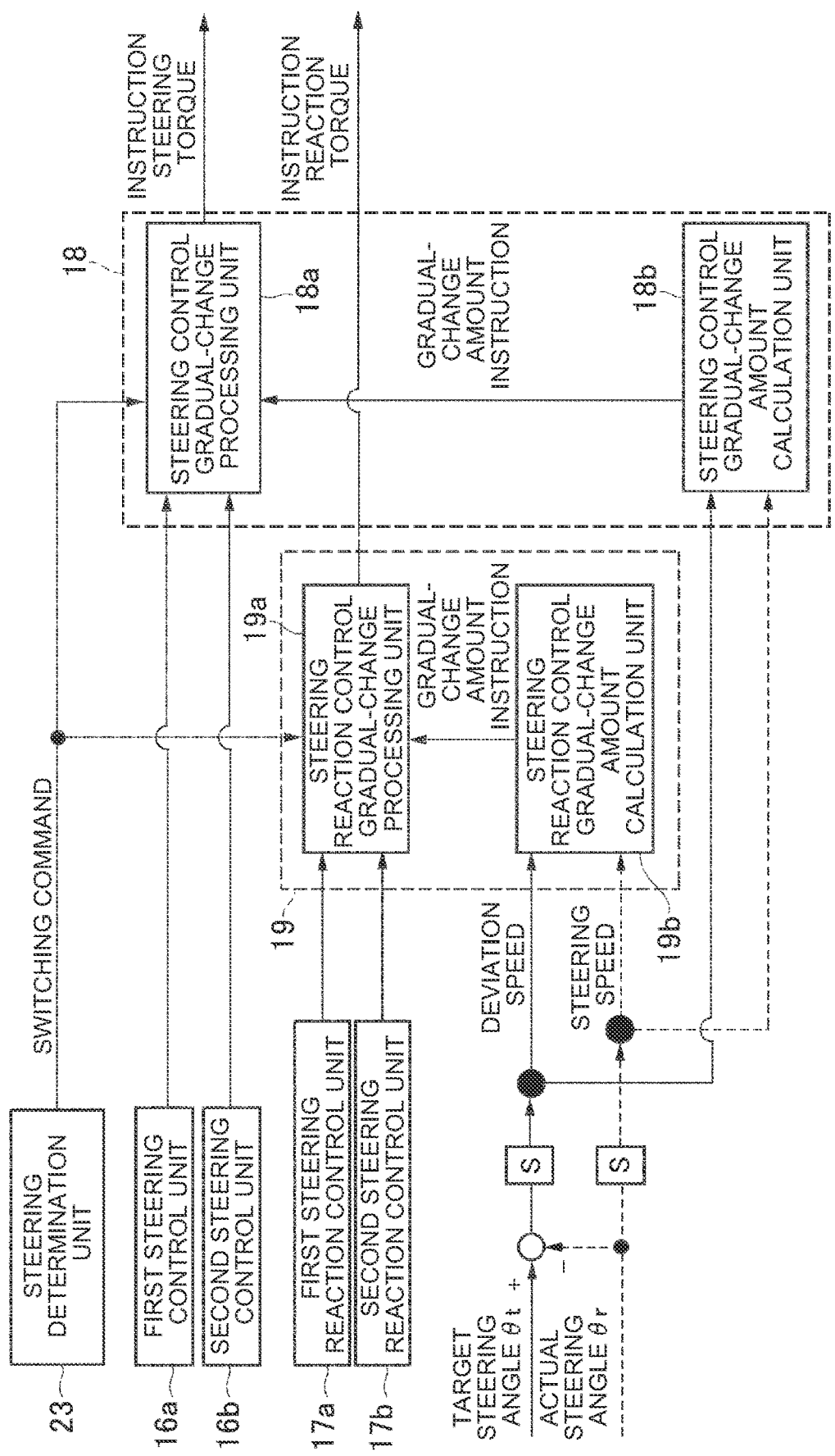
FIG. 3 is a block diagram showing s configuration of a steering control switching unit and a steering reaction control switching unit.

FIG. 3 is a block diagram showing the functions of the steering control switching unit 18 and the steering reaction control switching unit 19. The steering control switching unit 18 and the steering reaction control switching unit 19, shown in FIG. 3, are configured to gradually change the instruction steering torque and the instruction reaction torque to be output to the motor 10 during the transition period of switching from the first mode to the second mode, based on the change rate (deviation speed) of deviation Δθ between the target steering angle θt and the actual steering angle θr and on the change rate (steering speed) of the actual steering angle θr. The instruction steering torque and the instruction reaction torque correspond to the "instruction value" in the embodiment of the present disclosure.

The steering control switching unit 18, shown in FIG. 3, includes a steering control gradual-change processing unit 18a and a steering control gradual-change amount calculation unit 18b. The steering control gradual-change amount calculation unit 18b is a control unit that determines a torque to be subtracted from the first target steering torque. In the example shown in FIG. 3, the steering control gradual-change amount calculation unit 18b receives the signals of the deviation speed and the steering speed from an operation speed calculation unit (not shown) that calculates the deviation speed and the steering speed. In addition, the steering control gradual-change amount calculation unit 18b includes a map that sets the subtraction torque (steering gradual-change amount) to a value that is larger as the deviation speed (absolute value) and steering speed (absolute value) are faster as shown in FIG. 4 and is configured to determine the steering gradual-change amount according to the received deviation speed and steering speed.

Figure 4:
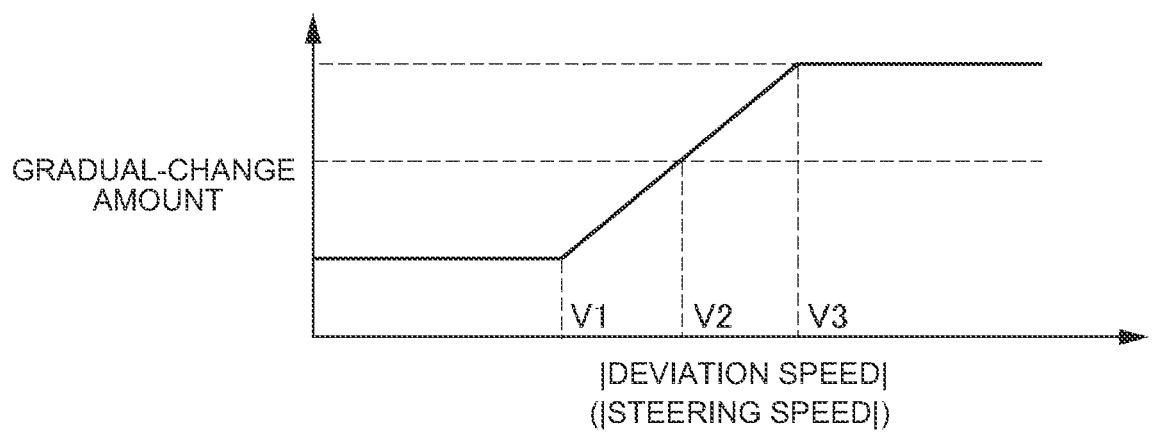
FIG. 4 is a map for determining a steering gradual-change amount or a reaction gradual-change amount based on a deviation speed or a steering speed.

The map shown in FIG. 4 is constructed by determining, in advance through experiment, the correlation between an operation speed or deviation speed of the steering wheel 4 and a steering amount of the steering wheel 4 when the driver operates the steering wheel 4 during autonomous driving and by setting a gradual-change amount so that the first target steering torque is reduced to the second target steering torque when the steering amount is reached.

The gradual-change amount mentioned above is the amount of change in the steering torque to be given to the motor 10 in each control cycle. Therefore, the gradual-change amount may be read as the change rate of instruction steering torque. The steering control gradual-change amount calculation unit 18b may determine the steering gradual-change amount based on one of the deviation speed and the steering speed or may include a two-dimensional map that determines the steering gradual-change amount using the deviation speed and the steering speed as the variables.

The steering control switching unit 18 is configured to input the steering gradual-change amount, calculated by the steering control gradual-change amount calculation unit 18b, to the steering control gradual-change processing unit 18a. The steering control gradual-change processing unit 18a is configured to calculate the instruction steering torque to be used during the transition period of switching from the first mode to the second mode. Therefore, in the example shown in FIG. 3, the steering control gradual-change processing unit 18a is configured to receive the signal indicating whether an intervention operation has been performed, which is determined by the steering determinator 20, and to receive the first target steering torque and the second target steering torque. In addition, when the steering determinator 20 determines that an intervention operation has been performed, the steering control gradual-change processing unit 18a calculates, for each control cycle, the instruction steering torque by subtracting the steering gradual-change amount, received from the steering control gradual-change amount calculation unit 18b, from the first target steering torque. Therefore, the instruction steering torque is gradually reduced from the first target steering torque to the second target steering torque.

The steering reaction control switching unit 19 is configured similarly to the steering control switching unit 18 described above. That is, the steering reaction control switching unit 19 includes a steering reaction control gradual-change processing unit 19a and a steering reaction control gradual-change amount calculation unit 19b. The steering reaction control gradual-change amount calculation unit 19b is a control unit that determines a torque to be subtracted from the first target reaction torque. In the example shown in FIG. 3, the steering reaction control gradual-change amount calculation unit 19b receives the deviation speed and the steering speed. In addition, similarly to the steering control gradual-change amount calculation unit 18b, the steering reaction control gradual-change amount calculation unit 19b is configured to calculate the reaction gradual-change amount based on a map that sets the subtraction torque (reaction gradual-change amount) to a value that is larger as the deviation speed and the steering speed are faster as shown in FIG. 4.

More specifically, the map shown in FIG. 4 is constructed by determining, in advance through experiment, the correlation between an operation speed or deviation speed of the steering wheel 4 and a steering amount of the steering wheel 4 when the driver operates the steering wheel 4 during autonomous driving and by setting a gradual-change amount so that the first target reaction torque is reduced to the second target reaction torque when that steering amount is reached.

The gradual-change amount mentioned above is the amount of change in the reaction torque to be given to the motor 10 in each control cycle. Therefore, the gradual-change amount may be read as the change rate of instruction reaction torque. The reaction gradual-change amount may be determined based on one of the deviation speed and the steering speed or a two-dimensional map may be provided that determines the reaction gradual-change amount using the deviation speed and the steering speed as the variables.

The steering reaction control switching unit 19 is configured to input the reaction gradual-change amount, calculated by the steering reaction control gradual-change amount calculation unit 19b, to the steering reaction control gradual-change processing unit 19a. The steering reaction control gradual-change processing unit 19a is configured to calculate the instruction reaction torque to be used during the transition period of switching from the first mode to the second mode. Therefore, in the example shown in FIG. 3, the steering reaction control gradual-change processing unit 19a is configured to receive the signal indicating whether an intervention operation has been performed, which is determined by the steering determinator 20, and to receive the first target reaction torque and the second target reaction torque. In addition, when the steering determinator 20 determines that an intervention operation has been performed, the steering reaction control gradual-change processing unit 19a calculates, for each control cycle, the instruction reaction torque by subtracting the reaction gradual-change amount, received from the steering reaction control gradual-change amount calculation unit 19b, from the first target reaction torque. Therefore, the instruction reaction torque is gradually reduced from the first target reaction torque to the second target reaction torque.

Figure 5:
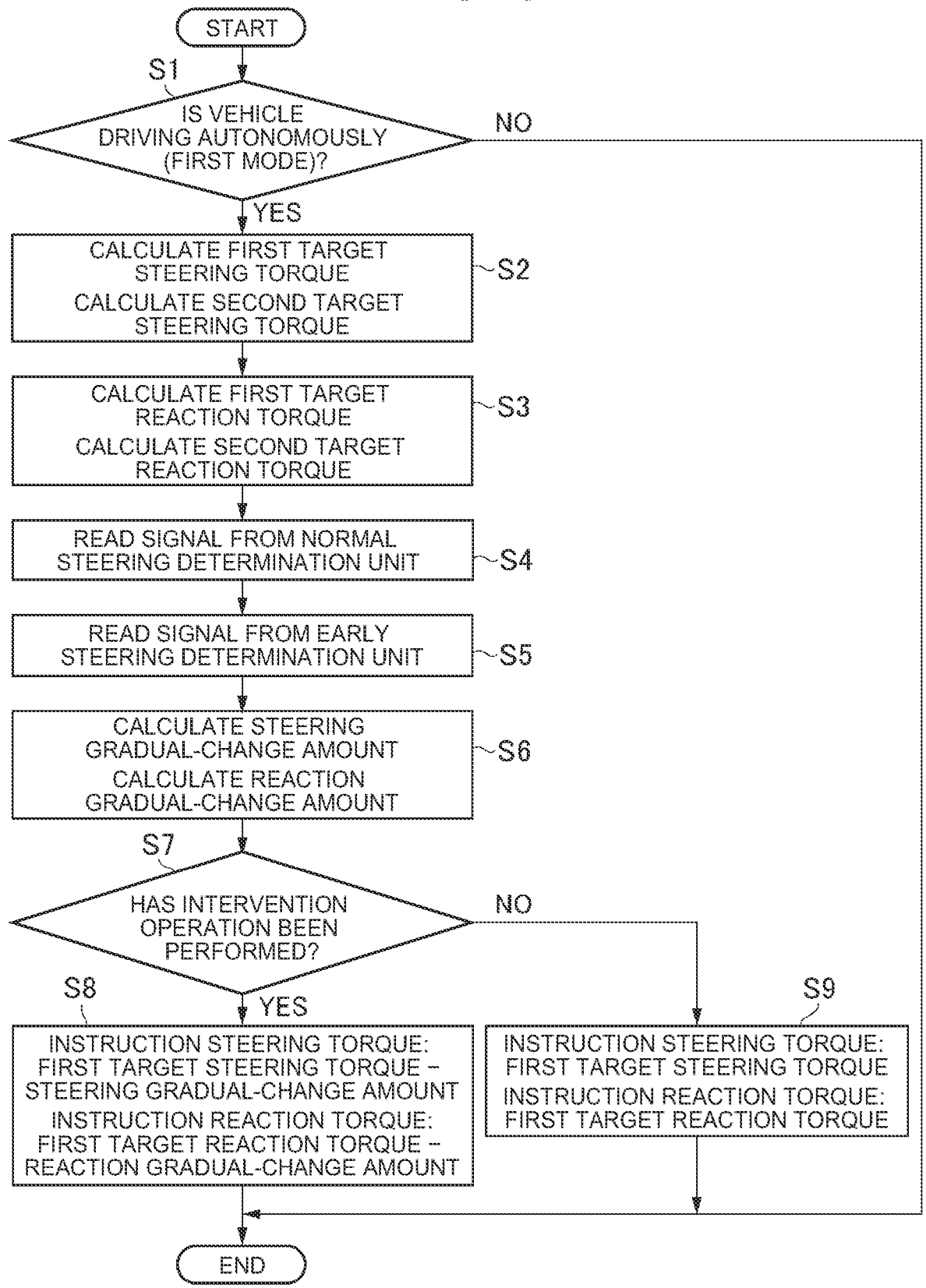
FIG. 5 is a flowchart showing an example of control performed by an autonomous driving control device in an embodiment of the present disclosure.

FIG. 5 is a flowchart showing an example of control executed by the EPS-ECU 14 described above. In the example shown in FIG. 5, it is determined first whether the vehicle 2 is driving autonomously in the first mode (step S1). When the vehicle 2 is not driving autonomously in the first mode, that is, when the vehicle 2 is driving autonomously in the second mode or the vehicle 2 is not driving autonomously and, as a result, the determination result of step S1 is negative, the routine once ends.

On the other hand, when the vehicle 2 is driving autonomously in the first mode and, as a result, the determination result of step S1 is affirmative, the first target steering torque is calculated by the first steering control unit 16a and, at the same time, the second target steering torque is calculated by the second steering control unit 16b (step S2). Similarly, the first target reaction torque is calculated by the first steering reaction control unit 17a and, at the same time, the second target reaction torque is calculated by the second steering reaction control unit 17b (step S3).

Next, the signal for determining whether the driver has performed an intervention operation is read. More specifically, the signal indicating whether the driver has performed an intervention operation is read from the normal steering determination unit 21 (step S4) and, at the same time, the signal indicating whether the driver has performed an intervention operation is read from the early steering determination unit 22 (step S5). Next, the steering gradual-change amount is calculated by the steering control gradual-change amount calculation unit 18b and, at the same time, the reaction gradual-change amount is calculated by the steering reaction control gradual-change amount calculation unit 19b (step S6).

Then, it is determined whether an intervention operation has been performed (step S7). That is, it is determined whether the signal indicating that an intervention operation has been performed is input from at least one of the normal steering determination unit 21 and the early steering determination unit 22 to the steering determination unit 23.

When an intervention operation has been performed and, as a result, the determination result of step S7 is affirmative, the instruction steering torque is calculated by subtracting the value calculated by multiplying the steering gradual-change amount, obtained in step S6, by the number of control cycles (or time) from the first target torque obtained in step S2. At the same time, the instruction reaction torque is calculated by subtracting the value calculated by multiplying the reaction gradual-change amount, obtained in step S6, by the number of control cycles (or time) from the first target reaction torque obtained in step S2 (step S8). Then, this routine ends. The instruction steering torque in step S8 has a lower limit value that is the second target steering torque obtained in step S2. Similarly, the instruction reaction torque in step S8 has a lower limit value that is the second target reaction torque obtained in step S2.

On the other hand, when an intervention operation has not been performed and, as a result, the determination result of step S7 is negative, the instruction steering torque and the instruction reaction torque are maintained (step S9) and the routine once ends. That is, the instruction steering torque is set to the first target steering torque, and the instruction reaction torque is set to the first target reaction torque.

Figure 6:
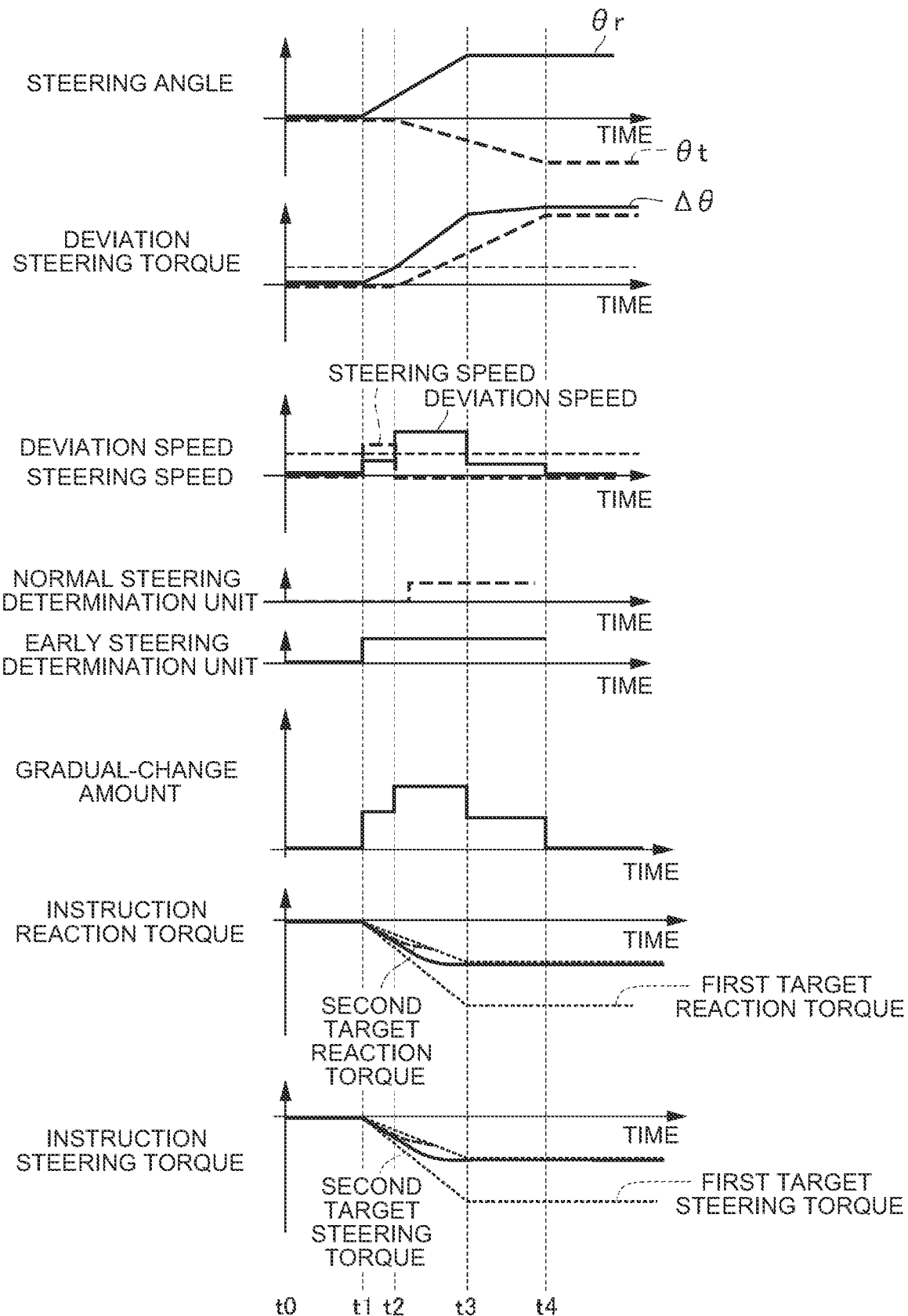
FIG. 6 is a timing diagram showing a change in an instruction reaction torque and an instruction steering torque when a steering wheel is operated at low speed.

FIG. 6 is a timing diagram showing a change in the instruction reaction torque and the instruction steering torque when the driver turns the steering wheel 4 at a relatively low speed while driving straight in the first mode. More specifically, the examples shown in FIG. 6 show a change in the instruction reaction torque and the instruction steering torque when the deviation speed between the actual steering angle θr and the target steering angle θt is equal to or smaller than V1 shown in FIG. 4. As comparative examples, the broken lines show a change in the instruction reaction torque and the instruction steering torque when a gradual-change amount (corresponding to V2 in FIG. 4) is set regardless of the deviation speed or the steering speed.

At time t0 shown in FIG. 6, the vehicle 2 is traveling straight autonomously in the first mode and, therefore, the actual steering angle θr (solid line) and the target steering angle θt (broken line) are zero. At time t1, the driver starts to operate the steering wheel 4 to the left at a relatively low speed. That is, at time t1, the actual steering angle θr starts to increase. Therefore, the deviation speed (solid line) increases and becomes equal to or higher than the predetermined speed. That is, the early steering determination unit 22 determines that an intervention operation has been performed. At time t1, the position of the vehicle 2 has not departed from the traveling route used in autonomous driving and, therefore, the target steering angle θt has not changed.

As the actual steering angle θr increases as described above, the deviation Δθ from the target steering angle θt becomes larger and, accordingly, the first target reaction torque, the first target steering torque, the second target reaction torque, and the second target steering torque start to increase. Note that, since the first target reaction torque and the first target steering torque are different, as described above, from the second target reaction torque and the second target steering torque in the gain by which the deviation Δθ is to be multiplied, the change rate of the first target reaction torque is larger than that of the second target reaction torque, and the change rate of the first target steering torque is larger than that of the second target steering torque.

When it is determined by the early steering determination unit 22 that an intervention operation has been performed, the determination result of step S7 in FIG. 5 is affirmative. Therefore, the instruction reaction torque is started to be gradually reduced from the first target reaction torque to the second target reaction torque, and the instruction steering torque is started to be gradually reduced from the first target steering torque to the second target steering torque. The reaction gradual-change amount and the steering gradual-change amount are determined based on at least one of the steering speed (broken line) and the deviation speed. In the example shown, they are set to the minimum value in FIG. 4.

At time t2, the position of the vehicle 2 departs from the traveling route during autonomous driving and, therefore, the target steering angle θt starts to increase in the direction opposite to the actual steering angle θr. That is, in opposition to the steering torque applied by the driver to turn the steering wheel 4, a steering torque is output from the motor 10. As a result, the steering shaft is twisted, the torque value (broken line) detected by the torque sensor 12 increases, and the normal steering determination unit 21 determines that an intervention operation has been performed.

Then, at time t3, the actual steering angle θr is increased to a predetermined angle and is maintained. In addition, the instruction reaction torque (solid line) and the instruction steering torque (solid line) match the second target reaction torque and the second target steering torque, respectively, at time t3.

On the other hand, when the reaction gradual-change amount and the steering gradual-change amount are uniformly set to the gradual-change amount corresponding to V2 shown in FIG. 4, the instruction reaction torque and the instruction steering torque are reduced to the second target reaction torque and the second target steering torque before time t3 as indicated by the broken line in FIG. 6. After that, the instruction reaction torque and the instruction steering torque are output following the second target reaction torque and the second target steering torque.

Setting the instruction reaction torque and the instruction steering torque based on the gradual-change amount, which is based on the steering speed and the deviation speed, as described above makes it possible, when the steering wheel 4 is steered by the driver, to shift from the first target reaction torque to the second target reaction torque, and the first target steering torque to the second target steering torque, at the time when the steering wheel 4 is operated up to the predetermined operation amount.

In other words, in the process of shift from the first target reaction torque to the second target reaction torque, it is possible to reduce a sudden change in the instruction reaction torque as shown by the broken line in FIG. 6, or to reduce a change in the way the amount of the instruction reaction torque is increased relative to the way the amount of the operation of the steering wheel 4 is increased. Similarly, in the process of shift from the first target steering torque to the second target steering torque, it is possible to reduce a sudden change in the instruction steering torque as shown by the broken line in FIG. 6, or to reduce a change in the way the amount of the instruction steering torque is increased relative to the way the amount of the operation of the steering wheel 4 is increased.

Therefore, when the driver performs an intervention operation, it is possible to reduce a driver's uncomfortable feeling for a change in the resistance or operability (operation feeling) of the operation of the steering wheel 4, or to reduce a tendency to understeer.

Figure 7:
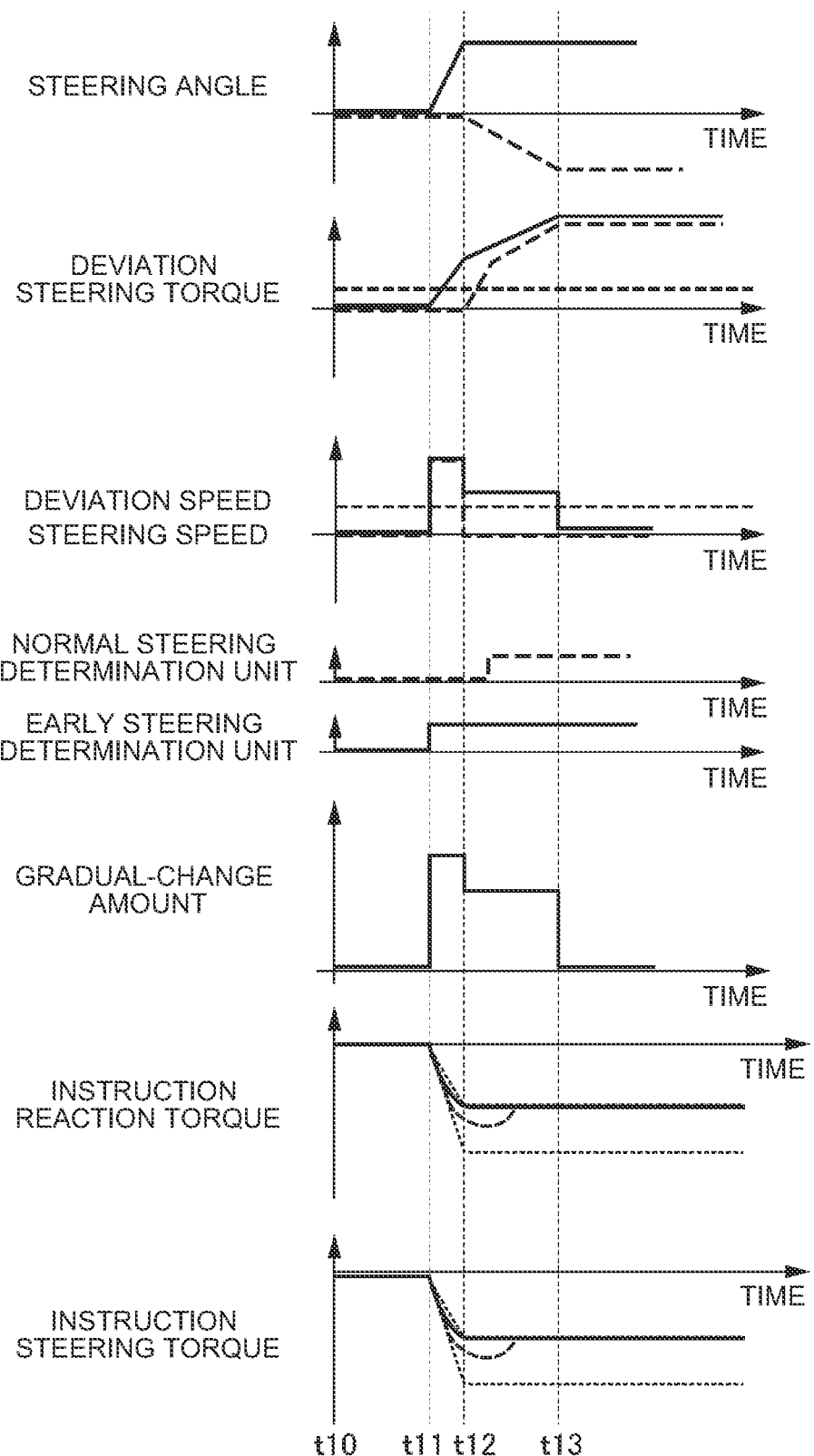
FIG. 7 is a timing diagram showing a change in the instruction reaction torque and the instruction steering torque when the steering wheel is operated at high speed.

FIG. 7 is a timing diagram showing a difference in a change in the instruction reaction torque and the instruction steering torque when the driver turns the steering wheel 4 at a relatively high speed while driving straight in the first mode. More specifically, the examples shown in FIG. 7 show a change in the instruction reaction torque and the instruction steering torque when the deviation speed between the actual steering angle θr and the target steering angle θt is equal to or larger than V3 shown in FIG. 4. As comparative examples, the broken lines show a change in the instruction reaction torque and the instruction steering torque when a gradual-change amount (corresponding to V2 in FIG. 4) is set regardless of the deviation speed or the steering speed.

At time t10 shown in FIG. 7, the vehicle is traveling straight autonomously in the first mode as in the example described above and, therefore, the actual steering angle θr and the target steering angle θt are zero. At time t11, the driver starts to operate the steering wheel 4 to the left at a relatively high speed. That is, the actual steering angle θr starts to increase at time t11. Therefore, the deviation speed (solid line) increases and becomes equal to or higher than the predetermined speed. That is, the early steering determination unit 22 determines that an intervention operation has been performed. At time t11, the position of the vehicle 2 has not departed from the traveling route used in autonomous driving and, therefore, the target steering angle θt has not changed.

As the actual steering angle θr increases as described above, the deviation Δθ from the target steering angle θt becomes larger and, accordingly, the first target reaction torque, the first target steering torque, the second target reaction torque, and the second target steering torque start to increase. Note that, since the first target reaction torque and the first target steering torque are different, as described above, from the second target reaction torque and the second target steering torque in the gain by which the deviation Δθ is to be multiplied, the change rate of the first target reaction torque is larger than that of the second target reaction torque, and the change rate of the first target steering torque is larger than that of the second target steering torque.

When it is determined by the early steering determination unit 22 that an intervention operation has been performed, the determination result of step S7 in FIG. 5 is affirmative. Therefore, the instruction reaction torque is started to be gradually reduced from the first target reaction torque to the second target reaction torque, and the instruction steering torque is started to be gradually reduced from the first target steering torque to the second target steering torque. The reaction gradual-change amount and the steering gradual-change amount are determined based on at least one of the steering speed (broken line) and the deviation speed. In the example shown, they are set to the maximum value in FIG. 4.

At time t12, the position of the vehicle 2 departs from the traveling route during autonomous driving and, therefore, the target steering angle θt starts to change in the direction opposite to the actual steering angle θr. That is, in opposition to the steering torque applied by the driver to turn the steering wheel 4, a steering torque is output from the motor 10. As a result, the steering shaft is twisted, the torque value (broken line) detected by the torque sensor 12 increases, and the normal steering determination unit 21 determines that an intervention operation has been performed.

In the example shown in FIG. 7, the actual steering angle θr is increased to a predetermined angle at time t12 and is maintained. In addition, the instruction reaction torque (solid line) and the instruction steering torque (solid line) match the second target reaction torque and the second target steering torque at time t12.

On the other hand, when the reaction gradual-change amount and the steering gradual-change amount are uniformly set to the gradual-change amount corresponding to V2 shown in FIG. 4, the instruction reaction torque and the instruction steering torque are reduced to the second target reaction torque and the second target steering torque after time t12 as indicated by the broken line in FIG. 7. More specifically, the instruction reaction torque and the instruction steering torque reach their peaks after time t12 and, after that, the instruction reaction torque and the instruction steering torque are reduced to the second target reaction torque and the second target steering torque. After that, the instruction reaction torque and the instruction steering torque are output following the second target reaction torque and the second target steering torque.

Setting the instruction reaction torque and the instruction steering torque based on the gradual-change amount, which is based on the steering speed and the deviation speed, as described above makes it possible, when the steering wheel 4 is steered by the driver, to shift from the first target reaction torque to the second target reaction torque, and the first target steering torque to the second target steering torque, at the time when the steering wheel 4 is operated up to the predetermined operation amount.

In other words, after time t12 when the actual steering angle θr is maintained, it is possible to reduce a torque fluctuation in which the instruction reaction torque and the instruction steering torque increase and then decrease. Therefore, when the driver performs an intervention operation, it is possible to reduce a driver's uncomfortable feeling for a change in the resistance or operability of the operation of the steering wheel 4, or to reduce a tendency to oversteer.

As described above, when the driver operates the steering wheel 4 while driving autonomously without operating the steering wheel 4, the autonomous driving control device in the embodiment of the present disclosure switches the target reaction torque from the first target reaction torque to the second target reaction torque, and the target steering torque from the first target steering torque to the second target steering torque, based on the gradual-change amount according to the steering speed and the deviation speed. Therefore, when the driver increases the steering angle of the steering wheel 4 to a predetermined angle, the first target reaction torque is switched to the second target reaction torque, and the first target steering torque to the second target steering torque. Therefore, this can reduce a difference between the time when the steering angle of the steering wheel 4 is increased to a predetermined angle and the time when the first target reaction torque is switched to the second target reaction torque and the first target steering torque is switched to the second target steering torque. As a result, a sudden change in the steering feeling of the steering wheel 4 and deterioration in operability can be reduced.

In the control examples described above, the gradual-change amount for changing from the first target reaction torque and the first target steering torque to the second target reaction torque and the second target steering torque is configured to be determined based on the steering speed and the deviation speed. On the other hand, based on the steering speed and deviation speed, the gain for determining the first target reaction torque and the first target steering torque may be configured to be gradually changed (gradual-change) toward the gain for determining the second target reaction torque and the second target steering torque.

Furthermore, the torque characteristics of the first target reaction torque shown in FIG. 6 and FIG. 7 are configured to increase in proportion to the deviation between the actual steering angle θr and the target steering angle θt. Instead, for example, in a region where the actual steering angle θr is small, the torque characteristics of the first target reaction torque may be set to torque characteristics higher than the torque characteristics shown in FIG. 6 and FIG. 7.

Note that the configuration of the steering device described above is not limited to that shown in FIG. 1 but that the so-called steer-by-wire configuration may be used. In the steer-by-wire configuration, the steering wheel 4 and the steered wheels 3 are not mechanically connected and a reaction motor, which applies reaction torque to the steering wheel 4, and a steering motor, which generates steering torque that steers the steered wheels 3 according to the steering angle of the steering wheel 4, are included. In that case, the configuration may be such that the reaction motor is controlled based on the instruction reaction torque and the steering motor is controlled based on the instruction steering torque.

In the example described above, in the vehicle 2 where the first mode, in which autonomous driving is performed without the need for the driver to operate the steering wheel 4, and the second mode, which is configured to allow the driver to operate the steering wheel 4 as appropriate during autonomous driving, can be set, the configuration is such that, when an intervention operation is performed while driving in the first mode, it is configured that the mode is switched to the second mode. Instead, it may also be configured that the mode is switched between autonomous driving and manual driving. That is, the second target reaction torque may be set to the target reaction torque determined by the steering device employed in a conventional vehicle, with the second steering torque set to zero.

In addition, in the present disclosure, the steering unit for steering may be a control stick (steering stick or joystick) instead of the above-mentioned steering wheel. In that case, since the control stick is not turned but is tilted left and right, the actual steering angle in the above embodiment can be treated as the actual tilting angle. Therefore, the steering angle in the embodiment of the present disclosure includes a tilting operation angle. Furthermore, though the left direction steering angle is described as a "positive" angle and the right direction steering as a "negative" angle in the embodiment described above, these "positive" and "negative" angles may be the opposite of the above embodiment or absolute values may be used without using "positive" and "negative".

What is claimed is:

1. An autonomous driving control device comprising:
   a steering unit configured to be operated by a driver;
   steered wheels configured to be steered in response to an operation of the steering unit;
   an actuator configured to generate a steering force to steer the steered wheels; and
   a detection unit configured to detect an operation amount of the steering unit, the autonomous driving control device being configured to be able to switch between a first control mode and a second control mode, the first control mode being a mode in which the actuator is controlled for driving without a need for the driver to operate the steering unit, the second control mode being a mode in which the actuator is controlled for driving in such a way that a steering force required to operate the steering unit is smaller than in the first control mode, wherein:
   the autonomous driving control device includes a controller that controls the actuator, the controller including,
   a steering determination unit configured to determine that the driver has operated the steering unit while driving with the actuator controlled in the first control mode,
   an operation speed calculation unit configured to calculate a speed that is at least one of a deviation speed and a steering speed, the deviation speed being a change rate of deviation between a target steering angle during autonomous driving and an actual steering angle that is based on an operation amount detected by the detection unit, the steering speed being a change rate of the actual steering angle, and
   a control mode switching unit configured to change, when the steering determination unit determines that the driver has operated the steering unit, an instruction value to be output to the actuator from an instruction value corresponding to a first target control amount of the actuator determined according to the first control mode to an instruction value corresponding to a second target control amount of the actuator determined according to the second control mode at a change rate corresponding to a speed that is at least one of the deviation speed and the steering speed calculated by the operation speed calculation unit.

2. The autonomous driving control device according to claim 1, wherein:
   the actuator is configured to generate a reaction force in opposition to a steering force of the steering unit applied by the driver; and
   the first control mode has the reaction force that is higher than the second control mode.

3. The autonomous driving control device according to claim 1, wherein:
   the actuator is configured to generate the steering force to steer the steered wheels; and
   the first control mode has the steering force that is higher than the second control mode.

4. The autonomous driving control device according to claim 1, wherein:
   the first control mode is configured to determine the first target control amount by multiplying a deviation between the target steering angle and the actual steering angle by a first gain;
   the second control mode is configured to determine the second target control amount by multiplying a deviation between the target steering angle and the actual steering angle by a second gain smaller than the first gain; and
   the control mode switching unit is configured to change a gain from the first gain to the second gain at a change rate corresponding to a speed that is at least one of the deviation speed and the steering speed.

5. The autonomous driving control device according to claim 1, wherein the control mode switching unit is configured, based on a correlation obtained in advance between the deviation speed or the steering speed and an operation amount of the steering unit when the driver operates the steering unit, to determine a change rate of the instruction value so that, when the steering unit is operated at the deviation speed or the steering speed, the second target control amount is achieved at a point when the operation amount is reached.

* * * * *